United States Patent
Tatekawa et al.

(10) Patent No.: US 7,921,434 B2
(45) Date of Patent: Apr. 5, 2011

(54) DISC DEVICE HAVING MULTIPLE DISK CARRY-IN SPEEDS

(75) Inventors: Tsutomu Tatekawa, Iwaki (JP); Tokio Suzuki, Iwaki (JP); Ichiro Kato, Iwaki (JP); Hiroshi Kawase, Iwaki (JP); Yusuke Yoshida, Iwaki (JP); Nobunori Kudou, Iwaki (JP); Yousuke Kuno, Iwaki (JP)

(73) Assignees: Alpine Electronics, Inc., Tokyo (JP); Toshiba Alpine Automotive Technology, Inc., Tokyo (JP)

( * ) Notice: Subject to any disclaimer, the term of this patent is extended or adjusted under 35 U.S.C. 154(b) by 92 days.

(21) Appl. No.: 12/412,993

(22) Filed: Mar. 27, 2009

(65) Prior Publication Data

US 2009/0265727 A1 Oct. 22, 2009

(30) Foreign Application Priority Data

Apr. 22, 2008 (JP) ................................. 2008-110893

(51) Int. Cl.
*G11B 17/04* (2006.01)
(52) U.S. Cl. ....................... 720/626; 720/606
(58) Field of Classification Search .................. 720/601, 720/602, 606, 617, 619, 620, 621, 622, 623, 720/624, 626

See application file for complete search history.

(56) References Cited

U.S. PATENT DOCUMENTS

| 5,038,337 | A  | * | 8/1991  | Muramatsu et al. | 720/645     |
|-----------|----|---|---------|------------------|-------------|
| 5,042,025 | A  | * | 8/1991  | Aoyagi et al.    | 369/190     |
| 5,150,349 | A  | * | 9/1992  | Takai et al.     | 720/626     |
| 5,828,641 | A  | * | 10/1998 | Abe et al.       | 720/645     |
| 6,288,982 | B1 | * | 9/2001  | Kato             | 369/30.36   |
| 6,480,442 | B1 | * | 11/2002 | Nakatani et al.  | 369/30.36   |
| 6,683,826 | B1 | * | 1/2004  | Matsuo et al.    | 369/30.36   |
| 6,963,519 | B2 | * | 11/2005 | Otsuki et al.    | 369/30.85   |
| 6,990,673 | B2 | * | 1/2006  | Lee              | 720/623     |
| 7,210,150 | B2 | * | 4/2007  | Urushihara et al.| 720/620     |

FOREIGN PATENT DOCUMENTS

JP 2007-066351 3/2007

* cited by examiner

*Primary Examiner* — Tan X Dinh
(74) *Attorney, Agent, or Firm* — Brinks Hofer Gilson & Lione (57) ABSTRACT

When a normal disk having the diameter of 12 cm is inserted into the disk device, first and second optical detecting elements detect the insertion, and transitions to a first detection state, which initiates transfer operation of first and second transfer rollers. If the disk is further moved to an inner portion of the device, thus pressing first and second detecting pins, first and second detecting switches are turned OFF, and the detecting elements enter a second detection state. Before the transition from the first detection state to the second detection state occurs, a rotating speed of the first and second transfer rollers is set low. After transition to the second detection state, the rotating speed is increased. As a result, a card or other such foreign objects can be removed and a monitoring period can be increased until detection of a normal disk is detected.

12 Claims, 5 Drawing Sheets

FIG. 5

DISC DEVICE HAVING MULTIPLE DISK CARRY-IN SPEEDS

PRIORITY CLAIM

This application claims the benefit of Japanese Patent Application No. 2008-110893, filed on Apr. 22, 2008, and which is incorporated by reference herein in its entirety.

BACKGROUND OF THE INVENTION

1. Field of the Invention

The present invention relates to a disk device having with a transfer mechanism for conveying a disk inserted from an insertion opening into the disk device, and a detecting mechanism for detecting whether an inserted disk is normal.

2. Description of the Related Art

A disk device equipped on a vehicle or the like has a slit-like insertion opening on the front of a casing. A disk inserted from the insertion opening is carried into the device by means of a transfer roller provided in the casing. Then, the disk is held and rotated by a rotating unit provided in the casing or transferred to a disk holder for accommodating multiple disks in the casing. A disk device of this type includes a detecting mechanism for detecting insertion of the disk and detecting whether a normal disk having the diameter of 12 cm is inserted.

A disk device disclosed in Japanese Unexamined Patent Application Publication No. 2007-66351 has a pair of optical detecting elements provided inside an insertion opening. If an optical detecting element detects that a disk inserted from the insertion opening crosses an optical detecting element and then switches its detection output level, a transfer roller is driven in a carry-in direction. In addition, a pair of detecting pins pressed by an outer edge of the carried disk and a pair of switches monitoring motions of each detecting pin, are provided inside the insertion opening. When a normal disk inserted, the pair of detecting pins operate at the same time, so that output levels of both switches are switched.

Further, a distance between the pair of detecting pins is set to prevent such a situation that, when a disk having the diameter of 8 cm is inserted, the pins are both pressed by the outer edge of the disk and output levels of the pair of switches are switched.

A control unit executes the following control process: A predetermined monitoring period is set following the time when a detection output level of the optical detecting element was switched and the transfer roller was driven in the carry-in direction. If output levels of the pair of switches are both switched within the preset predetermined monitoring period, it is determined that a normal disk having the diameter of 12 cm has been inserted, and the disk is directly carried into a casing. Further, if output levels of the pair of switches are not switched within the monitoring period from when a detection output level of the optical detecting element is switched and the transfer roller is driven in the carry-in direction, it is determined that a disk having the diameter of 8 cm, rather than a normal disk, has been inserted. The transfer roller is rotated in the reverse direction to eject the disc.

In the disk device, a disk conveyance distance is determined depending on a positional relationship between an optical detecting element and a pair of switches. The disk conveyance distance is a distance a disk moves during a period from when a detection output level of the optical detecting element is switched until when output levels of the pair of switches are switched. If the conveyance distance is set too long, in the case where a foreign material smaller than the disk having the diameter of 8 cm, such as a credit card or a business card, is inserted, the foreign material goes deep into the device within the monitoring period that is set to monitor the output. In this case, it is likely that the foreign material cannot be removed from the device as a result of coming off the transfer roller, for example.

On the other hand, if a positional relationship between an optical detecting element and a pair of switches is determined so as to reduce the conveyance distance of the foreign object, such as the credit card or a business card, for example, the monitoring period can be reduced. Thus, at the point where the foreign material moves into the casing by a small amount, output levels of the pair of switches can be monitored to detect the foreign material.

However, if the monitoring period set to determine where a normal disk is inserted is too short, in the case where someone holds a normal disk in his hand and slowly inserts the disk, output levels of the pair of switches cannot be both switched within the monitoring period despite the normal disk. As a result, the normal disk tends to be regarded as a foreign material.

SUMMARY

The present invention has been accomplished with a view to solving the above problems and it is accordingly an object of the present invention to provide a disk device capable of detecting an abnormal condition that any foreign material other than a normal disk is inserted, before the foreign material moves deep into the device, and capable of setting a relatively-long monitoring period that is used to determine whether a normal disk is inserted.

A disk device according to the present invention includes: an insertion opening formed in a casing; a transfer mechanism provided inside the insertion opening; a control unit for controlling the transfer mechanism; and a detecting mechanism that is shifted to a first detection state if an object is inserted from the insertion opening and shifted to a second detection state if the object is a normal disk and the disk is carried into the disk device with the transfer mechanism, the control unit controlling the transfer mechanism if the detecting mechanism is shifted to the second detection state within a predetermined monitoring period following a time when the detecting mechanism was shifted to the first detection state to continue a carry-in operation of the transfer mechanism and increase a carry-in speed of the transfer mechanism more than a carry-in speed in the predetermined monitoring period.

In the disk device according to the present invention, during a period from when the detecting mechanism is shifted to the first detection state until when shifted to the second detection state, a carry-in speed of the transfer mechanism is set relatively low. Thus, a long time can be secured for determination as to whether a normal disk is inserted. Even if a normal disk held in one's hand is slowly inserted, for example, the disk is not likely to be regarded as an abnormal disk. On the other hand, since a distance a disk moves during a monitoring period is not long, if a foreign material such as a credit card or a business card is inserted, it is easy to prevent the foreign material from moving deep into the device.

Further, after the detecting mechanism was shifted to the second detection state, the carry-in speed of the transfer mechanism is increased. Thus, a time necessary to carry a normal disk into the device is not too long.

In addition, according to the present invention, the carry-in speed of the transfer mechanism is increased after the detecting mechanism was shifted to the second detection state. However, the carry-in speed may be kept at a relatively low speed throughput the monitoring period from when the detecting mechanism is shifted to the first detection state until when shifted to the second detection state. Alternatively, the carry-in speed may be changed in the monitoring period. For example, the carry-in speed may be set low only in a given period of the monitoring period and after the given period, set to as high speed as the speed set after the mechanism was shifted to the second detection state, albeit within the monitoring period.

According to the present invention, if the detecting mechanism is not shifted to the second detection state within the predetermined monitoring period following the time when shifted to the first detection state, the control unit preferably switches an operation of the transfer mechanism from the carry-in operation to a discharge operation.

The transfer mechanism is switched to the discharge operation to thereby remove a foreign material from the insertion opening before the material moves deep into the device.

According to the present invention, if the detecting mechanism is shifted to the first detection state, the control unit starts the carry-in operation of the transfer mechanism.

With the above structure, if the detecting mechanism is shifted to the first detection state, the transfer mechanism starts the carry-in operation and in addition, the measurement of the monitoring period is started. However, in the present invention, it is not always necessary to drive the transfer mechanism when the detecting mechanism is shifted to the first detection state. For example, the transfer mechanism may be driven in a carry-in direction when any other detection unit detects insertion of a disk or the like, and then, measurement of the monitoring period may be started if the detecting mechanism is shifted to the first detection state.

According to the present invention, at the time when the detecting mechanism is shifted to the first detection state in response to insertion of a normal disk from the insertion opening, the transfer mechanism applies no carry-in force to the disk, and after the transfer mechanism applied a carry-in force to the normal disk, the detecting mechanism is shifted to the second detection state.

Further, the disk device according to the present invention may be also structured such that the detecting mechanism includes a first detecting unit that is shifted to the first detection state if a normal disk is inserted, and a second detecting unit that is shifted from the first detection state to the second detection state if the normal disk is further moved to an inner portion.

Here, in the present invention, only one kind of detecting units such as a pair of optical detecting elements or a pair of switches may be provided, and one detecting unit may be switched between the first detection state and the second detection state along with an operation of carrying a normal disk into the device.

According to the present invention, for example, a pair of the second detecting units is provided at a distance in a direction of an opening width of the insertion opening, and if a normal disk having a diameter of 12 cm is carried into the device, the second detecting unit is switched to the second detection state in response to insertion of the disk.

In this case, it is preferred that if a disk having a diameter of 8 cm is carried into the device, the second detecting unit is not shifted to the second detection state. Further, it is preferred that if a card having the same size as a credit card is carried into the device, the second detecting unit is not shifted to the second detection state.

According to the present invention, the transfer mechanism includes a transfer roller, and the transfer speed is determined based on a rotating speed of the transfer roller. However, a transfer mechanism other than the transfer roller may be used to carry a disk into the device by means of a rotational conveying force of a belt, for example.

According to the present invention, it is preferred that the detecting mechanism switched between the first detection state and the second detection state is provided between the insertion opening and the transfer roller.

If the detecting mechanism is provided between the insertion opening and the transfer roller, it is possible to reduce a transfer distance of the transfer roller during a period from when a normal disk is inserted until when the mechanism is shifted to the first detection state. Therefore, even if a foreign material such as a credit card or a business card is inserted from an insertion opening, it is possible to determine that the inserted material is not a normal disk before the foreign material moves deep into the casing.

In other words, according to the present invention, it is preferred that a normal disk is carried into the device by a distance shorter than ½ of the diameter of the disk in a period from when the detecting mechanism is shifted to the first detection state until when shifted to the second detection state.

If a carry-in distance in a period from when the mechanism is shifted from the first detection state to the second detection state is set to less than ½ of the diameter of a disk, in the case where a foreign material having the length that is half as long as the diameter of a disk is inserted, it is possible to determine that the inserted material is not a normal disk before the foreign material moves deep into the device.

According to the disk device of the present invention, if a foreign material such as a card smaller than the diameter of a normal disk is inserted, it is possible to detect the insertion of the foreign material before the foreign material moves deep into the device. On the other hand, a monitoring period for detecting whether a normal disk is inserted can be set long. Hence, even if a normal disk is slowly inserted to an insertion opening, for example, the inserted disk can be easily regarded as a normal one.

DETAILED DESCRIPTION

Figure 1:
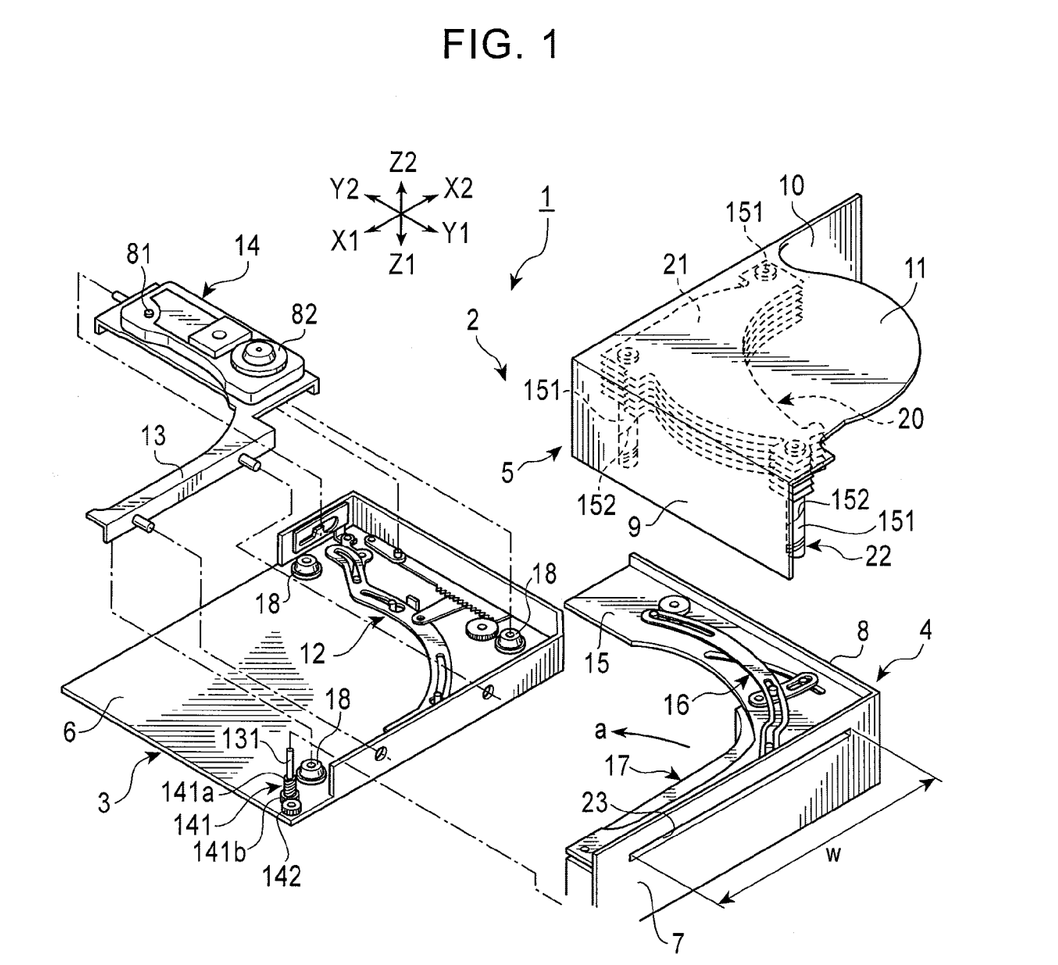
FIG. 1 is an exploded perspective view showing the overall structure of a disk device according to an embodiment of the present invention.

A disk device 1 shown in FIG. 1 includes a box-like casing 2. To describe reference directions of the casing 2, in FIG. 1, Z1 denotes a lower side, Z2 denotes an upper side, X1 denotes a left side, X2 denotes a right side, Y1 denotes a front side, and Y2 denotes a back side. In addition, in FIG. 1, an X1-X2 direction is a transverse direction and an Y1-Y2 direction is a depth direction.

The casing 2 is assembled by stacking a lower casing 3, an intermediate casing 4, and an upper casing 5 one on top of each other. The lower casing 3 includes a bottom face 6 of a casing 2. The intermediate casing 4 includes a front face 7 and a right side face 8. The upper casing 5 includes a left side face 9, a rear face 10, and a top face 11.

A unit supporting base 13 is provided on the bottom face 6 of the lower casing 3. The unit supporting base 13 is elastically supported by a damper 18 placed on the bottom face 6. A driving unit 14 is mounted onto the unit supporting base 13. A mechanism base 15 is provided in an upper portion of the intermediate casing 4 in parallel to the bottom face 6. A transfer unit 17 functioning as a transfer mechanism is provided below the mechanism base 15 and inside the front face 7.

A disk storage region 20 is defined by the upper casing 5 surrounded by the left side face 9, the rear face 10, and the top face 11. The disk storage region 20 includes a plurality of supporting members 21 capable of supporting a disk D, which are stacked one on top of the other in the thickness direction (Z1-Z2 direction in FIG. 1). In this example, six supporting members 21 are provided but the embodiments may have fewer than six supporting members 21 or more than six supporting members.

A normal disk D having the diameter of 12 cm can be carried into the disk device 1. Examples thereof include a CD (compact disk), a CD-ROM, and a DVD (digital versatile disk). The disk device 1 allows insertion of only the normal disk D having the diameter of 12 cm, and the other disks (for example, a disk d having the diameter of 8 cm or a card C (see FIG. 4)) are regarded as a foreign material and are rejected from the device.

An insertion opening 23 is formed in the front face 7 of the casing 2. The insertion opening 23 has a slit-like shape, and its vertical size (height) is a little larger than a thickness of the normal disk D, and its horizontal opening size (opening width) W is a little larger than the diameter of the normal disk D. A shutter (not shown) is provided inside the front face 7 of the casing 2. The shutter is slidable along the Z1-Z2 direction and driven by a shutter switching mechanism provided in the intermediate casing 4. The shutter slides upward to open insertion opening 23 if the disk D is inserted into the insertion opening 23 and carried into the casing 2. If the disk D in the casing 2 is ejected from the insertion opening 23, the shutter moves downward to close the insertion opening 23.

Figure 2:
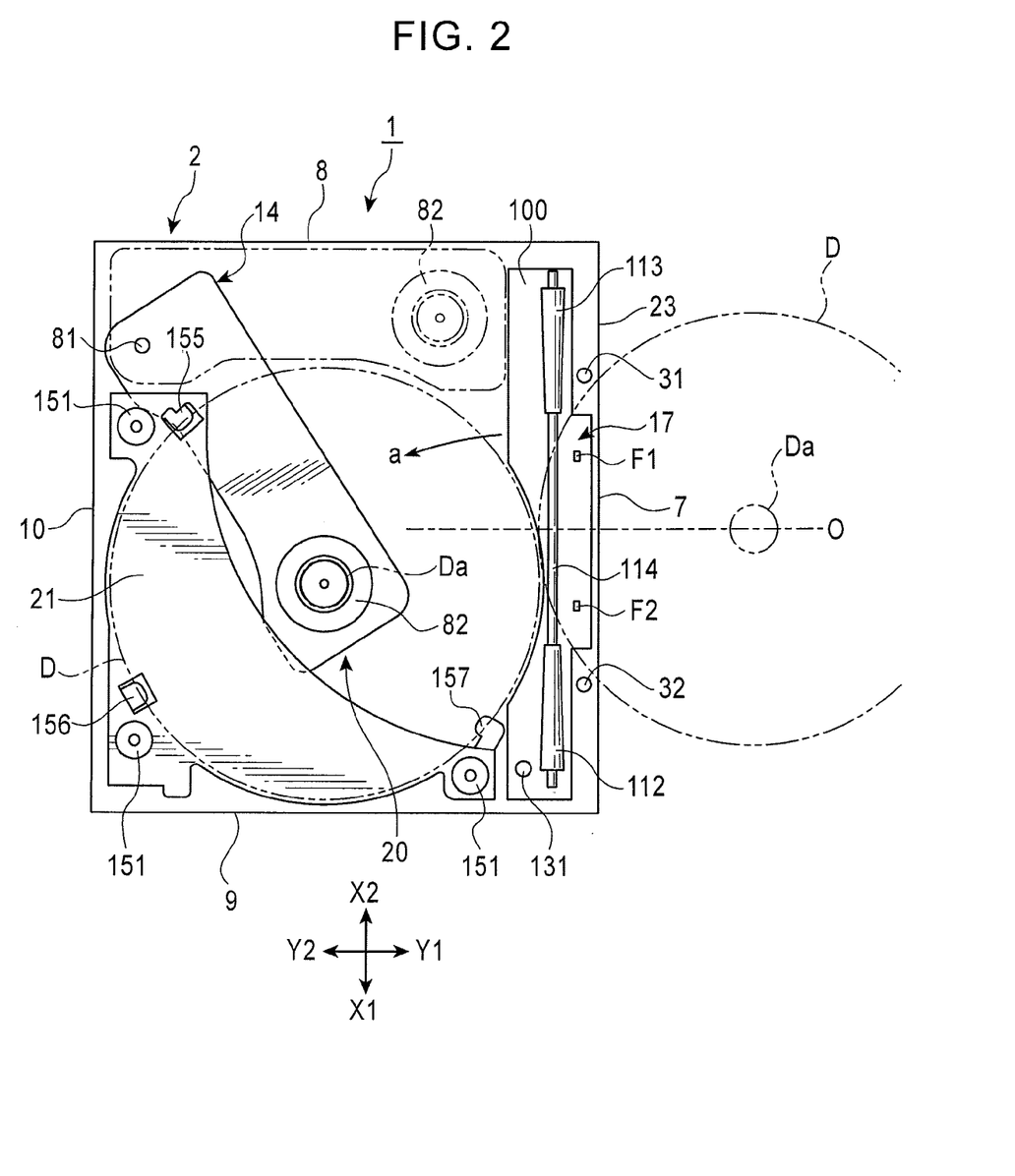
FIG. 2 is a top plan view of the disk device.

The transfer unit 17 is positioned at the same height as the insertion opening 23. As shown in FIG. 2, the transfer unit 17 includes a thin unit frame 100 formed of metal and extending along the X1-X2 direction in FIG. 2. An opening is defined inside the unit frame 100 in the Y1-Y2 direction in FIG. 2. A roller shaft 114 is provided inside the unit frame 100. The roller shaft 114 extends along the X1-X2 direction and is supported to both sides of the unit frame 100 at both ends. A first transfer roller 112 and a second transfer roller 113, which are made of a material having high friction coefficient such as synthetic rubber or natural rubber, are provided around the roller shaft 114. The first transfer roller 112 and the second transfer roller 113 are arranged at some interval in the axial direction.

A sliding member made of a low-friction material such as a synthetic resin material is provided inside the unit frame 100. The roller shaft 114 is biased against the sliding member by means of a spring. Since the first transfer roller 112 and the second transfer roller 113 are clamped down to the sliding member, both of the transfer rollers 112 and 113 and the sliding member can hold the disk D therebetween.

If the roller shaft 114 is rotated with the transfer rollers 112 and 113 being clamped to the disk D, the transfer rollers 112 and 113 are rotated together on the roller shaft 114. Here, if a large resistance force acts on the transfer rollers 112 and 113 by a user stopping insertion of the disk D, for example, the roller shaft 114 can slip and continue to rotate while the rotation of the transfer rollers 112 and 113 is stopped.

As shown in FIG. 2, the transfer unit 17 is rotatable at the end on the X1 side about a fulcrum shaft 131 fixed to the mechanism base 15 in a direction indicated by an arrow identified as reference letter "a". In FIG. 2, the transfer unit 17 is set in a standby position close to the inside of the front face 7 of the casing 2. The transfer unit 17 set in a standby position is positioned at a slight distance from the outer edge of the disk D to prevent the unit frame 100 from overlapping with the disk D.

As shown in FIG. 1, an integral gear 141 is rotatably supported to a lower portion of the fulcrum shaft 131. The integral gear 141 is composed of a vertical worm gear 141a provided in an upper portion and a lower gear 141b provided in a lower portion. On the bottom face 6, an intermediate gear 142 is rotatably provided. The intermediate gear 142 engages the lower gear 141b. A transfer motor M is provided on the bottom face 6, and a worm gear fixed to a rotating shaft of the transfer motor M engages the intermediate gear 142. Further, a gear is fixed to the roller shaft 114 supported to the unit frame 100, and a rotating force is applied by the vertical worm gear 141 a to the roller shaft 114 to rotate the first transfer roller 112 and the second transfer roller 113.

As shown in FIG. 1, the mechanism base 15 includes a transfer switching mechanism 16. The unit frame 100 of the transfer unit 17 is rotated from the standby position as shown in FIGS. 1 and 2 toward the (a) direction by means of a power of the transfer switching mechanism 16.

If the disk D is inserted from the insertion opening 23, the disk D is held between both of the transfer rollers 112 and 113 and the sliding member and the carried into the casing 2 by means of the rotating force applied by the transfer motor M. If the disk D is carried thereinto by a certain distance, for example, a distance corresponding to the radius, the transfer unit 17 begins to rotate about a support shaft 131 in the (a) direction. Next, the disk D is carried into the casing 2 by means of the rotating force of the transfer rollers 112 and 113 and the (a)-directional rotating force of the transfer unit 17.

A disk storage unit 20 in FIG. 1 is provided with a supporting member selecting unit 22. In the supporting member selecting unit 22, three selection shafts 151 extending downward in parallel to one another are supported by the top face 11 of the upper casing 5. The selection shafts 151 are rotated in synchronization with each other. A spiral selection groove 152 is formed around each of the selection shafts 151. A bearing hole formed in each of the six supporting members 21 is slidably receives each of the selection shafts 151, and an engagement projection formed inside the bearing hole is slidably engaged with the selection groove 152.

If each selection shaft 151 is rotated, a feeding force of the selection groove 152 moves each supporting member 21 upward or downward. If one of the supporting members 21 is selected and then moved to a selection position at the same height as the transfer unit 17 and stopped, a large interval is defined between the supporting member 21 at the selection position and the supporting member 21 positioned therebelow.

As shown in FIG. 2, each supporting member 21 includes holding claws 155, 156, and 157. The holding claws 155, 156, and 157 are supported by the supporting member 21 so as to rotate around the selection shafts 151.

As shown in FIG. 1, a switching mechanism 12 is provided on the bottom face 6 of the lower casing 3. The base portion of the driving unit 14 is supported by the support shaft 81 fixed to the unit supporting base 13, and is rotatable in a horizontal direction. When the supporting member selecting unit 22 moves the supporting member 21 vertically, the driving unit 14 is at a retraction position as indicated by the broken line of FIG. 2. If any supporting member 21 is moved to the selection position and stopped, the driving unit 14 is rotated clockwise by the switching mechanism 12, and moved to a driving position as indicated by the solid line in FIG. 2.

The normal disk D inserted into the insertion opening 23 is conveyed by means of a carry-in force of the transfer unit 17 and is moved to a position below the supporting member 21 at the selection position. An outer edge of the disk D is held between the lower face of the supporting member 21 and the holding claws 155, 156, and 157. At this time, a turntable 82 as a rotating section of the driving unit 14 opposes a portion under a center hole Da of the disk D held by the supporting members 21.

After the disk D was held by the supporting members 21 at the selection position, the driving unit 14 is lifted, and the turntable 82 is fitted to the center hole Da of the disk D. Then, clamp claws formed on the turntable 82 protrude radially, and the center hole Da of the disk D is clamped onto the turntable 82.

After that, the transfer unit 17 is moved back to the standby position as shown in FIG. 2, and the holding claws 155, 156, and 157 are rotated and separated from the lower face of the disk D. Thus, the disk D can be selected from the lower face of the supporting member 21. The disk D is rotated together with the turntable 82, and an optical head provided to the driving unit 14 reads signals recorded to the disk D or records signals to the disk D.

After the completion of rotating the disk D, the driving unit 14 is lifted, and the disk D is moved back to the lower face of the supporting member 21 at the selection position. The holding claws 155, 156, and 157 are rotated, and the disk D is held between the lower face of the supporting member 21 and the holding claws 155, 156, and 157. Then, the disk D held on the turntable 82 is disengaged. After that, the driving unit 14 is rotated to a retraction position as indicated by the broken line in FIG. 2, and the supporting member selecting unit 22 performs a selecting operation to move another supporting member to the selection position.

Figure 3:
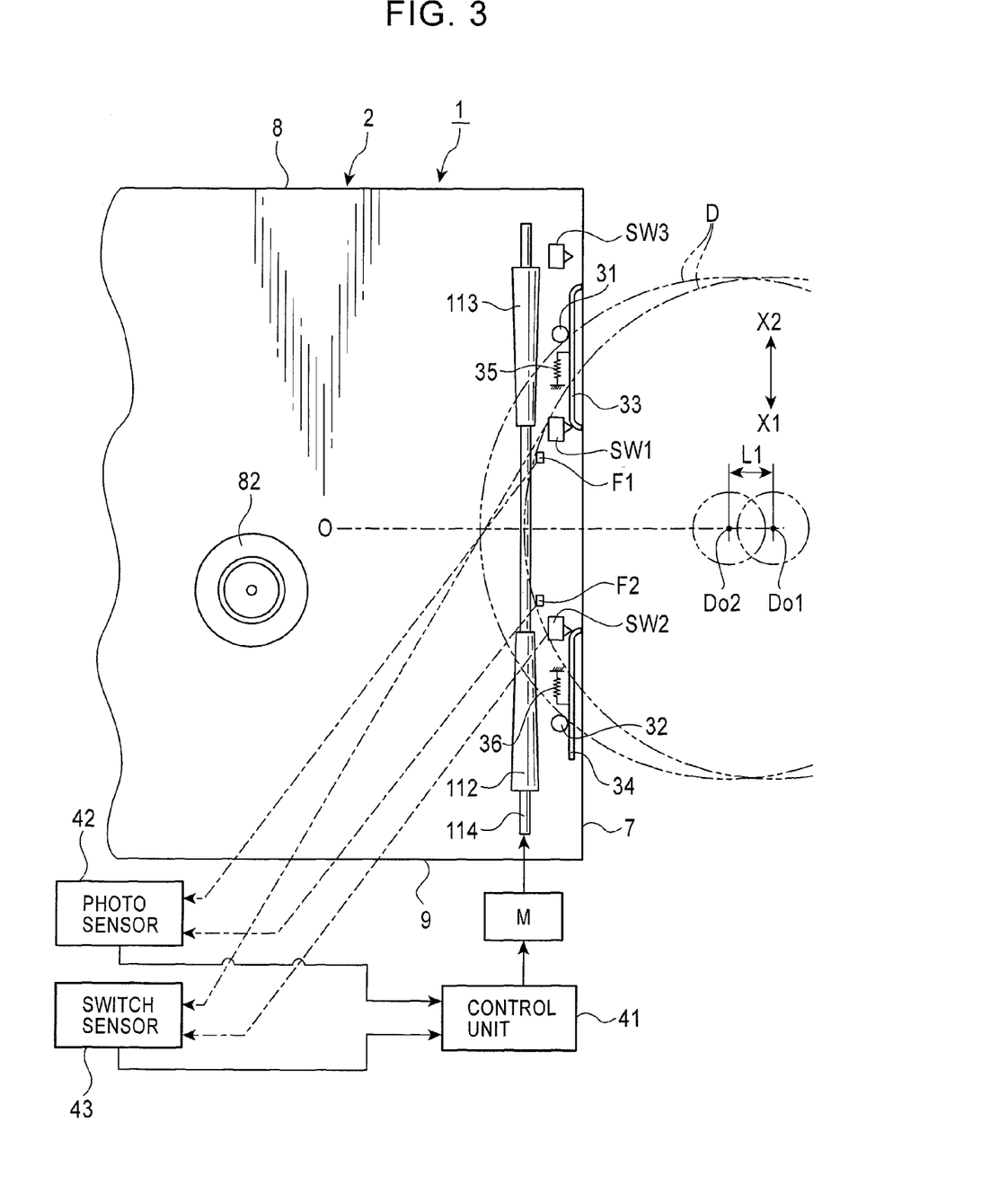
FIG. 3 is a plan view showing an operation following insertion of a normal disk.
Figure 4:
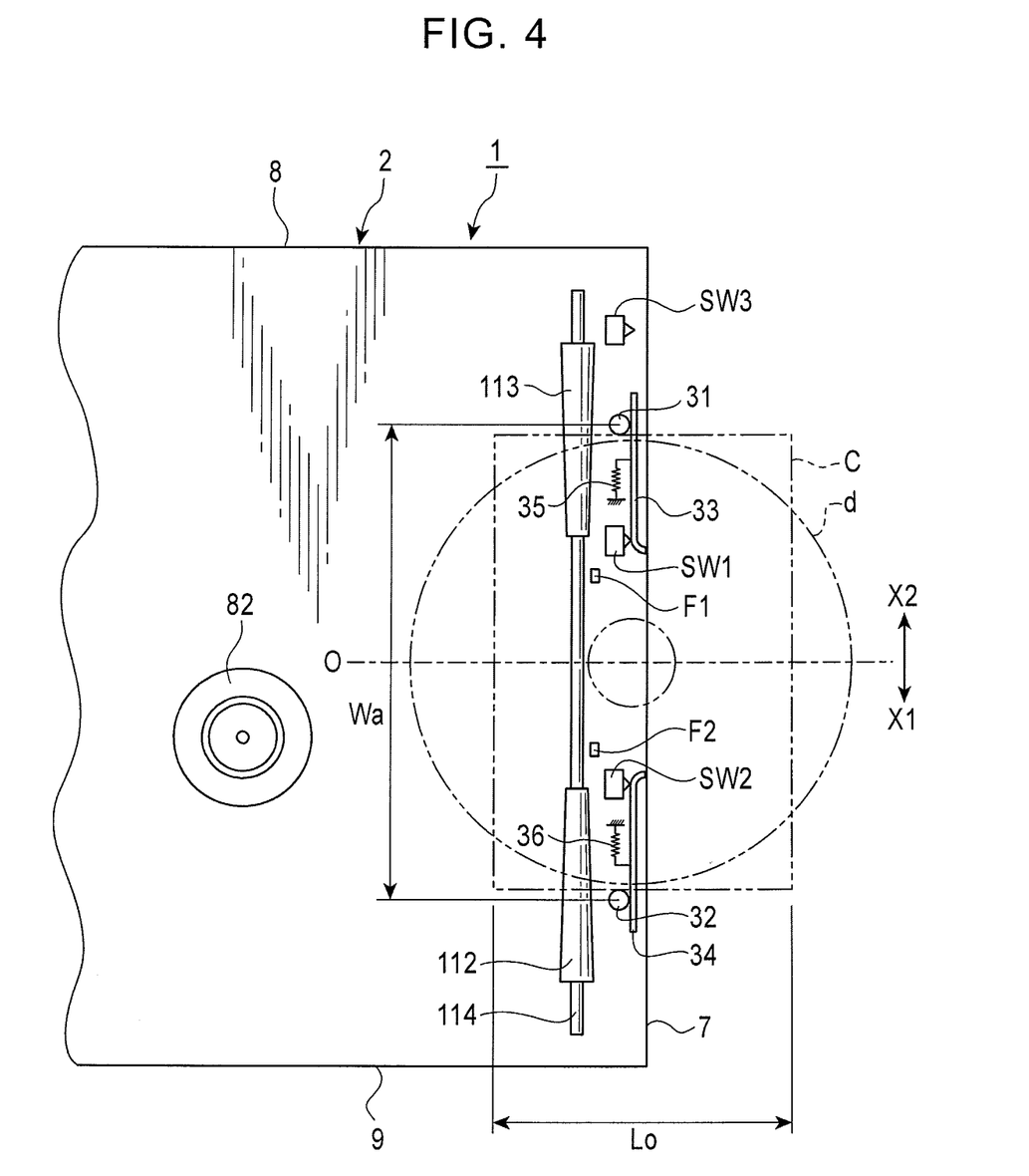
FIG. 4 is a plan view showing an operation following insertion of a foreign object.

As shown in FIGS. 3 and 4, a detecting mechanism is provided between the front face 7 of the casing 2 having the insertion opening 23 formed therein, and the first transfer roller 112 and the second transfer roller 113. The detecting mechanism is composed of a pair of optical detecting elements F1 and F2 functioning as a first detecting unit, and a pair of detecting pins 31 and 32 and a pair of detecting switches SW1 and SW2 functioning as a second detecting unit.

As shown in FIG. 1, the optical detecting elements F1 and F2 are attached to the unit frame 100 of the transfer unit 17, and a light emitting elements and a light receiving units are provided on both sides thereof and opposite from each other. An imaginary line passes the center of a movable width of the disk D in the transfer unit 17 (the center of the width W of the insertion opening 23 in FIG. 1) and extends orthogonally to the roller shaft 114, and is represented by a conveyance center line O. The optical detecting elements F1 and F2 are arranged on the X1 side and the X2 side at the same distance from the conveyance center line O. Further, the optical detecting elements F1 and F2 are provided between the first transfer roller 112 and the second transfer roller 113.

The detecting pins 31 and 32 are directed vertically in the Z1-Z2 direction inside the insertion opening 23. One of the detecting pins, for example, detecting pin 31, has a detecting plate 33 fixed thereto. The other detecting pin, for example, the detecting pin 32 has a detecting plate 34 fixed thereto. The detecting plate 33 is biased toward the X1 direction by a spring member 35 all the time. The detecting plate 34 is biased toward the X2 direction by a spring member 36. The detecting pins 31 and 32 are provided in positions where the disk D inserted into the insertion opening 23 abuts against the pins. The detecting plates 33 and 34 and the spring members 35 and 36 are provided in positions where the disk D inserted from the insertion opening 23 does not abut against these pines and members.

In the casing 2, a detecting switch SW1 and a detecting switch SW2 function as a second detecting unit, and are provided inside the front face 7. Further, a detecting switch SW3 functioning as a third detecting unit is provided closer to the X2 side than the detecting switch SW1.

As shown in FIG. 4, when no external force is applied to the detecting pins 31 and 32, a distance between the detecting pins 31 and 32 in the X-direction is set to the minimum (initial) value Wa due to the biasing force of the spring member 35 and 36. The movement of the detecting plates 33 and 34 toward the conveyance center line O is restricted by a stopper so as not to decrease the distance between the detecting pins 31 and 32 to less than the initial value Wa. Then, the detecting pin 31 and the detecting plate 33 are movable from the initial position as shown in FIG. 4 against the biasing force of the spring member 35 in the X2 direction. The detecting pin 32 and the detecting plate 34 are similarly movable from the initial position as shown in FIG. 4 against the biasing force of the spring member 36 in the X1 direction. Further, the detecting plates 33 and 34 are movable independently of each other, and thus, the detecting pins 31 and 32 can move independently.

When the detecting pins 31 and 32 are at the initial position as shown in FIG. 4, an output of the detecting switch SW1 is turned ON by the detecting plate 33, and an output of the detecting switch SW2 is also turned ON by the detecting plate 34. In addition, an output of the third detecting switch SW3 is turned OFF.

If the detecting pins 31 and 32 are at the initial position with the distance Wa, as shown in FIG. 3, in the case where the normal disk D having the diameter of 12 cm is inserted into the insertion opening 23, the outer edge of the normal disk D presses both of the detecting pins 31 and 32, the detecting plate 33 is separated from the detecting switch SW1, and the detecting plate 34 is separated from the detecting switch SW2. The result is that the detecting switches SW1 and SW2 are both switched from ON to OFF.

If the disk d having the diameter of 8 cm is inserted into the insertion opening 23 as shown in FIG. 4 when the detecting pins 31 and 32 are at the initial position, the outer edge of the disk d does not press both of the detecting pins 31 and 32 simultaneously, and the detecting switches SW1 and SW2 are not switched from ON to OFF. Even if one of the detecting switches SW1 and SW2 is switched from ON to OFF, both of the detecting switches SW1 and SW2 are never turned OFF at the same time.

Likewise, as shown in FIG. 4, even if the card C having the same size as a credit card or a business card is inserted into the insertion opening 23, the detecting switches SW1 and SW2 are never turned OFF at the same time.

As shown in FIG. 3, the transfer motor M for driving the roller shaft 114 is controlled by the control unit 41, which includes a CPU or a memory. Further, a change in detection output level of each of the optical detecting elements F1 and F2 is detected by a photo sensor 42, and the sensor notifies the control unit 41 of the detection result or transition. Further, a transition or change in output level of each of the detecting switches SW1, SW2, and SW3 is detected by a switch sensor 43, and the sensor notifies the control unit 41 of the detection result.

With this detecting mechanism, as shown in FIG. 3, if the normal disk D having the diameter of 12 cm is inserted into the insertion opening 23, and its center reaches Do1, the outer edge of the disk D crosses both of the optical detecting elements F1 and F2, and detection output levels of the optical detecting elements F1 and F2 are both switched. This state is referred to a first detection state. At this time, the control unit 41 activates the transfer roller M, and the roller shaft 114 is driven in a carry-in direction. Here, at this point of time, the outer edge of the disk D is away from the first transfer roller 112 and the second transfer roller 113, and rotating force of the transfer rollers 112 and 113 does not act on the disk D.

Moreover, if the disk D is inserted, the disk D is held by both of the transfer rollers 112 and 113 and the sliding member, and is carried into the casing 2. After that, when the center of the normal disk D reaches Do2 as shown in FIG. 3, the outer edge of the disk D presses the detecting pins 31 and 32 at the same time to increase a distance between the detecting pins 31 and 32 to switch the detecting switches SW1 and SW2 from ON to OFF. A state in which the detecting switches SW1 and SW2 are both turned OFF is referred to the second detection state.

As shown in FIG. 4, also when the disk d having the diameter of 8 cm or card C is inserted into the insertion opening 23, the disk d or the card C might cross the optical detecting elements F1 and F2. In this case, the state is shifted to the first detection state, and the transfer motor M is driven in a carry-in direction. However, the detecting switches SW1 and SW2 are never turned OFF at the same time, and the state is not shifted to the second detection state.

The disk device 1 sets a predetermined monitoring period following the time when the detecting mechanism was shifted or transitions to the first detection state, and if the mechanism is shifted to the second detection state within the monitoring period, the disk device determines that the normal disk D has been inserted into the insertion opening 23, and continues the carry-in operation. If the normal disk D is further carried into the device and the center of the disk D reaches a line connecting between centers of the detecting pins 31 and 32, the detecting pin 31 and the detecting plate 33 pressed by the outer edge of the disk D are moved to the farthest position in the X2 direction. At this time, an output level of the detecting switch SW3 is switched from OFF to ON by the detecting plate 33. This state is referred to a third detection state of the detecting mechanism.

If the detecting mechanism is shifted to the second detection state within a predetermined monitoring period after shifted to the first detection state, the control unit 41 continues the carry-in operation. Then, if the mechanism is shifted to the third detection state within the following predetermined period, the unit determines that the normal disk D has been inserted and keeps on the carry-in operation. In a subsequent carry-in operation, the unit frame 100 of the transfer unit 17 is rotated in the (a) direction in FIG. 2, and the disk D is carried into the device by means of both of the rotating force of the transfer rollers 112 and 113 and the rotating operation of the unit frame 100.

Referring to a flowchart of FIG. 5, the carry-in operation of the disk device 1 of the present invention will be described in detail.

Figure 5:
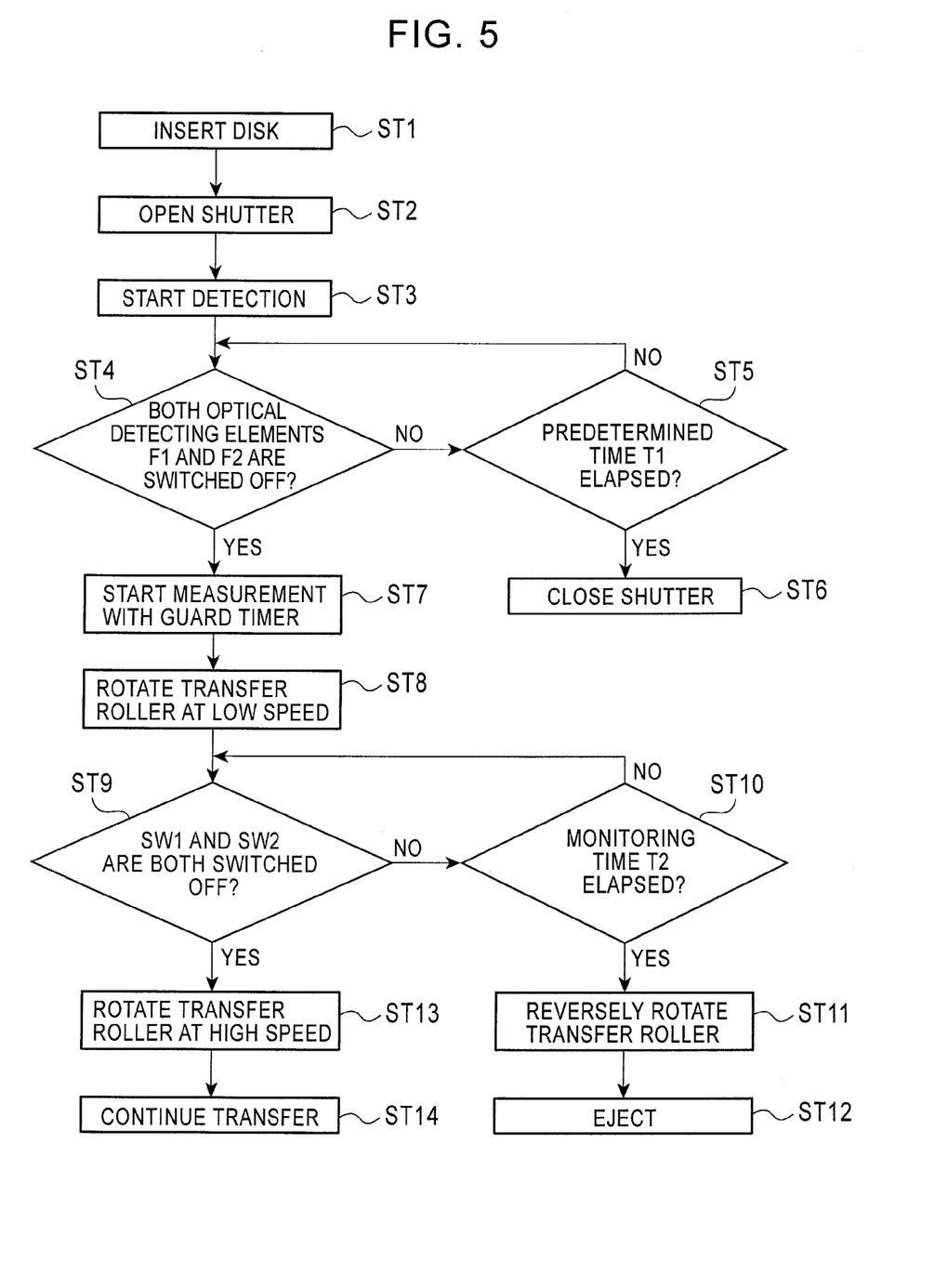
FIG. 5 is a flowchart of a disk device process.

In FIG. 5, each step is indicated by reference symbol "ST".

A disk insertion operation in ST 1 is executed by operating an operation button provided on a panel with reference to a display of the panel provided in the front of the front face 7 of the casing 2 to select an available supporting member 21 holding no disk D. If the selected supporting member 21 is already set in a selection position, the processing immediately advances to ST 2. If the selected supporting member 21 is not at a selection position, the driving unit 14 is moved to a retraction position indicated by the broken line in FIG. 2. Then, the supporting member selecting unit 22 is driven with the transfer unit 17 being also moved to a retraction position indicated by the broken line in FIG. 2. Along with the above operation of the supporting member selecting unit 22, the plurality of supporting members 21 are moved vertically along the selection shafts 151, and the selected supporting member 21 reaches the selection position to complete the selection operation. Then, the processing advances to ST 2 to drive the shutter to open the insertion opening 23.

After that, the processing shifts to ST 3 to start detection processing. The detection processing monitors detection signals supplied from the photo sensor 42 and the switch sensor 43 with the control unit 41.

In ST 3, the time is measured with a guard timer in the control unit 41. In ST 4, the time is monitored to determine whether both of the optical detecting elements F1 and F2 are switched from ON to OFF within a predetermined period T1 from the start of the measurement. In ST 5, if both of the optical detecting elements F1 and F2 are not turned OFF within the predetermined period T1, the processing shifts to ST 6 to determine that no material has not been inserted from the insertion opening 23. Then, the shutter is driven to close the insertion opening 23. After that, the unit waits for the next disk insertion operation.

In ST 4, if both of the optical detecting elements F1 and F2 are turned OFF within the predetermined period T1 and shifted to the first detection state, the control unit 41 determines that some material has been inserted from the insertion opening 23, and the processing shifts to ST 7. In ST 7, the time is measured with the guard timer. In this case, a monitoring period T2 is set based on the assumption that the time when the optical detecting elements F1 and F2 are both turned OFF is the start time of measurement. When the measurement of the monitoring period T2 is started, the processing advances to ST 8, and the transfer motor M is driven to rotate the roller shaft 114 in a carry-in direction. Here, at this time, a voltage to be applied to the transfer motor M is set to about 40% of a voltage to be applied after the mechanism would be shifted to the second detection state, and the roller shaft 114 is rotated at a low speed.

In ST 9, the detecting switches SW1 and SW2 are monitored to determine if both are switched OFF and shifted to the second detection state within the monitoring period T2. In ST 10, if the switches are not shifted to the second detection state within the monitoring period T2, it is determined that the inserted one is not a normal disk D, and the processing shifts to ST 11 to reversely rotate the transfer motor M to perform a discharge operation. In this case, it is more likely that a foreign object, such as the disk d having the diameter of 8 cm or the card C has been inserted. Thus, the foreign object is ejected from the insertion opening 23 with the discharge operation.

On the other hand, in ST 9, if the switches are shifted to the second detection state within the monitoring period T2, the processing shifts to ST 13, and the control unit 41 sends an instruction to increase a voltage to be applied to the transfer motor M. Therefore, after the switches were shifted to the second detection state, the rotating speed of the transfer motor M is increased, and the transfer rollers 112 and 113 transfers the disk D at a higher carry-in speed. The processing directly shifts to ST 14 to continue of the carry-in operation for the disk D.

In the carry-in operation, a carry-in distance L1 of the disk D by which the disk D is conveyed from when both of the optical detecting elements F1 and F2 are switched OFF and shifted to the first detection state in ST 4 in response to the insertion of the normal disk D until when the detecting switches SW1 and SW2 are both switched OFF and shifted to the second detection state in ST9, is as short as a distance necessary to move the center of the disk from the position Do1 to the position Do2 as shown FIG. 3. However, during this period, the transfer rollers 112 and 113 are rotated at a relatively low speed, and thus, a long time can be secured to convey the disk D by the carry-in distance L1.

The monitoring period T2 is set longer than a period necessary for the disk D to move the carry-in distance L1 by the transfer rollers 112 and 113 without slippage of the roller shaft 114. For example, the monitoring period T2 is set about 1.5 to 3 times longer than a period necessary for the disk D to move the carry-in distance L1. Here, the monitoring period should be set shorter than a period necessary to convey the card C in FIG. 4 by the short-side length L0 with the transfer rollers 112 and 113 rotating together with the roller shaft 114 without slippage of the roller shaft 114. Preferably, in the monitoring period T2, the conveyance distance is set to ⅔ or less and further, ½ or less of the short-side length L0 of the card. In general, the short-side length L0 of the card C is about 50 mm to 60 mm.

In other words, the distance by which the disk or card is conveyed by the transfer rollers 112 and 113 within the monitoring period T2 is set longer than L1 in FIG. 3, and preferably, 1.5 to 3 times longer than the distance L1. In addition, the conveyance distance is set shorter than the size L0 of the card C and preferably, ⅔ or less or ½ or less of the size L0. Moreover, considering a relationship between the monitoring period T2 and a rotating speed of the transfer rollers 112 and 113 in the monitoring period, it is preferred that the conveyance distance of the disk or card falls within the above range if the monitoring period T2 is set to 1 second or more and 1.5 seconds or less.

If the monitoring period T2 is set as above, in the case where the card C is inserted by mistake, this foreign object can be detected in ST 10 before the card C moves deep inside the casing 2 and separates from the transfer rollers 112 and 113, and the discharge processing in ST 12 can be started. Since the moving distance of the disk d having the diameter of 8 cm is longer than L0, the disk d can be regarded as a foreign object in ST 10 before separating from the transfer rollers 112 and 113, and the processing can shift to discharge processing.

Moreover, the monitoring period from when the switches are shifted to the first detection state until when shifted to the second detection state can be set as long as 1 second or more. Thus, even if the normal disk D held in one's hand is slowly inserted from the insertion opening 23, the disk D can be slowly and smoothly inserted due to a low transfer speed of the transfer rollers 112 and 113. In addition, a possibility that the monitoring period T2 elapses before the switches are shifted to the second detection state in ST 9 can be lowered. Therefore, it becomes easy to prevent such a situation that the normal disk D is considered as a foreign object.

Further, after the switches were shifted to the second detection state in ST 9, the carry-in speed of the transfer rollers 112 and 113 are switched to a high speed, the total loading time from when the normal disk D is inserted from the insertion opening 23 until when the disk D is held by the supporting member 21 at the selection position, can be set short.

The above embodiments describe the disk storage type disk device 1 with the plurality of supporting members 21 being accommodated in the casing 2. However, the present invention is applicable to a single type disk device in which only one disk may be accommodated in the casing 2.

Although only a few exemplary embodiments have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. A disk device comprising:
    a casing;
    an insertion opening formed in the casing;
    a transfer mechanism provided adjacent the insertion opening;
    a control unit configured to control the transfer mechanism;
    a detecting mechanism configured to transition to a first detection state if an object is inserted into the insertion opening, and configured to transition to a second detection state if the object inserted is determined to be a disk of a first diameter;
    wherein the transfer mechanism carries the disk into the insertion opening at a first carry-in speed after the detecting mechanism transitions to the first detection state; and
    wherein if the detecting mechanism transitions to the second state within a predetermined monitoring period after the detecting mechanism transitions to the first detection state, the control unit controls the transfer mechanism to carry the disk into the insertion opening at a second carry-in speed so as to facilitate a carry-in operation of the transfer mechanism, the second carry-in speed being greater than the first carry-in speed.

2. The disk device according to claim 1, wherein if the detecting mechanism does not transition to the second detection state within the predetermined monitoring period after transition to the first detection state, the control unit switches an operation of the transfer mechanism from the carry-in operation to a discharge operation.

3. The disk device according to claim 1, wherein if the detecting mechanism transitions to the first detection state, the control unit starts the carry-in operation.

4. The disk device according to claim 3, wherein if a disk of the first size is inserted into the insertion opening, at the time when the detecting mechanism transitions to the first detection state, the transfer mechanism applies a no carry-in force to the disk, and after the transfer mechanism applies a carry-in force to the disk of the first size, the detecting mechanism transitions to the second detection state.

5. The disk device according to claim 1, wherein the detecting mechanism includes a first detecting unit that transitions to the first detection state if a disk of the first size is inserted, and a second detecting unit that transitions from the first detection state to the second detection state if the disk of the first size is further moved to an inner portion.

6. The disk device according to claim 5, wherein a pair of the second detecting units is provided in a direction along a width of the insertion opening, and if a disk of the first size having a diameter of 12 cm is carried into the device, the pair of second detecting units transitions to the second detection state in response to insertion of the disk.

7. The disk device according to claim 6, wherein if a disk having a diameter of 8 cm is carried into the device, the pair of second detecting units do not transition to the second detection state.

8. The disk device according to claim 6, wherein if an object having dimensions substantially equal to a credit card is carried into the device, the pair of second detecting units do not transition to the second detection state.

9. The disk device according to claim 1, wherein the transfer mechanism includes a transfer roller, and the first and second carry-in speeds are based on a rotational rate of the transfer roller.

10. The disk device according to claim 9, wherein the detecting mechanism is provided between the insertion opening and the transfer roller.

11. The disk device according to claim 10, wherein during the time from the first detection state until the second detection state, the transfer mechanism operates at a carry-in speed so that the disk does not enter into the insertion opening by more than a distance equal to one-half a diameter of the disk.

12. The disk device according to claim 1, wherein a disk of the first size is a normal disk having a diameter of about 12 cm.

* * * * *